US012579918B2

(12) United States Patent (10) Patent No.: US 12,579,918 B2
Kang (45) Date of Patent: Mar. 17, 2026

(54) COVER FINISH ASSEMBLY

(71) Applicant: HYUNDAI MOBIS CO., LTD., Seoul (KR)

(72) Inventor: I Seul Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 225 days.

(21) Appl. No.: 18/508,489

(22) Filed: Nov. 14, 2023

(65) Prior Publication Data

US 2024/0412668 A1 Dec. 12, 2024

(30) Foreign Application Priority Data

Jun. 12, 2023 (KR) ........................ 10-2023-0074595

(51) Int. Cl.
| | |
|---|---|
| *B60Q 3/54* | (2017.01) |
| *B60Q 3/283* | (2017.01) |
| *B60R 13/00* | (2006.01) |
| *B60R 13/02* | (2006.01) |
| *B60R 21/203* | (2006.01) |
| *B60R 21/215* | (2011.01) |
| *G09F 13/04* | (2006.01) |

(Continued)

(52) U.S. Cl.
CPC ............. *G09F 21/048* (2013.01); *B60Q 3/54* (2017.02); *B60R 13/005* (2013.01); *B60R 13/02* (2013.01); *B60R 21/203* (2013.01); *B60R 21/215* (2013.01); *G09F 13/044* (2021.05); *B60Q 3/283* (2017.02); *B60R 2021/21543* (2013.01); *F21W 2106/00* (2018.01)

(58) Field of Classification Search
CPC ........ G09F 21/04; G09F 21/048; G09F 13/04; G09F 13/044; B60Q 3/54; B60Q 3/283; B60R 13/005; B60R 13/00; B60R 13/02; B60R 21/215; B60R 21/203; B60R 21/21656; B60R 21/21658; B60R 21/2037; B60R 2021/21543; F21W 2106/00; F21W 106/00; F21W 107/10
USPC .................. 280/728.3, 731; 40/593; 362/546
See application file for complete search history.

(56) References Cited

U.S. PATENT DOCUMENTS

| | | | | |
|---|---|---|---|---|
| 10,507,764 | B2 * | 12/2019 | Schneider | B60Q 3/14 |
| 2014/0145419 | A1 * | 5/2014 | Ishikawa | B60R 21/2165 |
| | | | | 280/728.3 |

(Continued)

FOREIGN PATENT DOCUMENTS

| | | | | |
|---|---|---|---|---|
| CN | 201998890 U | * | 10/2011 | B60Q 3/54 |
| DE | 19925546 B4 | * | 2/2004 | B60R 21/216 |

(Continued)

*Primary Examiner* — Keith J Frisby
(74) *Attorney, Agent, or Firm* — Novo TechIP International PLLC

(57) ABSTRACT

A cover finish assembly according to one embodiment of the present invention may include a cover part of which a front portion is covered with leather and in which an insertion hole is formed, a cap part which is inserted into the insertion hole from a front surface of the cover part and corresponds to an edge shape of the insertion hole, and an insertion part inserted into the cap part from a back surface of the cover part after the cap part is inserted into the insertion hole so that a front portion of the insertion part is exposed, and the cap part may be disposed between the cover part and the insertion part to finish a boundary of a cover part.

10 Claims, 8 Drawing Sheets

(51) Int. Cl.
G09F 21/04 (2006.01)
*F21W 106/00* (2018.01)

(56) References Cited

U.S. PATENT DOCUMENTS

| | | | | |
|---|---|---|---|---|
| 2019/0351860 A1 * | 11/2019 | Ohki | ..................... | B60Q 3/20 |
| 2020/0164825 A1 * | 5/2020 | Ide | ..................... | B60R 21/203 |
| 2021/0061189 A1 * | 3/2021 | Fujimori | .............. | B60R 13/005 |
| 2022/0169196 A1 * | 6/2022 | Harm | ................... | B60R 21/216 |
| 2023/0391278 A1 * | 12/2023 | Kutchey | .............. | B60R 21/215 |

FOREIGN PATENT DOCUMENTS

| | | | | | |
|---|---|---|---|---|---|
| DE | 102009045638 | B4 * | 1/2016 | .......... | B60R 13/005 |
| JP | 2018069931 | A * | 5/2018 | | |

* cited by examiner

COVER FINISH ASSEMBLY

CROSS-REFERENCE TO RELATED APPLICATIONS

This application claims priority to and the benefit of Korean Patent Application No. 10-2023-0074595, filed on 12 Jun. 2023, the disclosure of which is incorporated herein by reference in its entirety.

TECHNICAL FIELD

The present invention relates to a cover finish assembly, and more specifically, to a cover finish assembly which provides finishing to prevent leather of a cover covered with the leather and the like from being pushed.

BACKGROUND

In the case of components disposed inside a vehicle, an outer side may be covered with leather and the like to provide an aesthetically superior design. When a hole is formed in a component covered with a leather cover and there is a component inserted into the hole, the finish of the leather cover is often problematic.

An example thereof may be a driver's seat of a vehicle. An airbag injection cover of a driver side of the vehicle may be covered with leather for a luxurious design. In addition, a manufacturer's emblem and logo may be inserted with a type of lighting module for a design of the cover.

When the lighting module is inserted from a back surface of the driver's airbag injection cover covered with the leather cover and exposed forward, the lighting module is inserted into a hole of a logo model formed in the cover and pushes the covering leather cover out, and thus the finish of the leather cover is degraded. Accordingly, the need for a structure which does not affect the finish of the leather cover is increasing while inserting and assembling an insertion such as the lighting module from the back surface.

SUMMARY

The present invention is directed to providing a cover finish assembly which improves finishing quality by preventing leather from being pushed and lifted by a specific object when there is the specific object inserted from a back surface of a cover of which a front surface is covered with the leather and the specific object is inserted.

Objectives to be solved through the present invention are not limited to the above-described objectives, and other objectives which are not described above will be clearly understood to those skilled in the art from the following description.

According to an aspect of the present invention, there is provided a cover finish assembly including a cover part of which a front portion is covered with a leather cover and in which an insertion hole is formed, a cap part which is inserted into the insertion hole from a front surface of the cover part and corresponds to an edge shape of the insertion hole, and an insertion part inserted into the cap part from a back surface of the cover part after the cap part is inserted into the insertion hole so that a front portion of the insertion part is exposed.

The cap part may be disposed between the cover part and the insertion part.

A fixing pin may extend from a lower side of the cap part, and the fixing pin may pass through the insertion hole and may be bent toward one side and hooked on the cover part.

According to another aspect of the present invention, there is provided a cover finish assembly further including a fixing plate coupled to a lower side of a cap part.

The fixing plate may correspond to an edge shape of the insertion hole so that the insertion part passes through the insertion hole.

A fixing pin may extend from a lower side of the cap part, a fixing hole may be formed in the fixing plate, and the fixing pin may be inserted into the fixing hole.

After the fixing pin is inserted into the fixing hole, a portion of the fixing pin which passes through the fixing hole may be bent toward one side and hooked on the cover part.

A thickness of a portion of the cap part disposed inside the insertion hole may be greater than a thickness of the fixing pin so that an inner side surface of the cap part is disposed to be coplanar with an inner boundary of the fixing plate.

The cap part may include an edge portion which is bent in front of the insertion hole and covers the cover part constituting an edge of the insertion hole.

The insertion part may include a lighting unit to emit light forward, and the cap part and the insertion part may constitute an emblem of a vehicle.

The cap part may be formed of aluminum.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
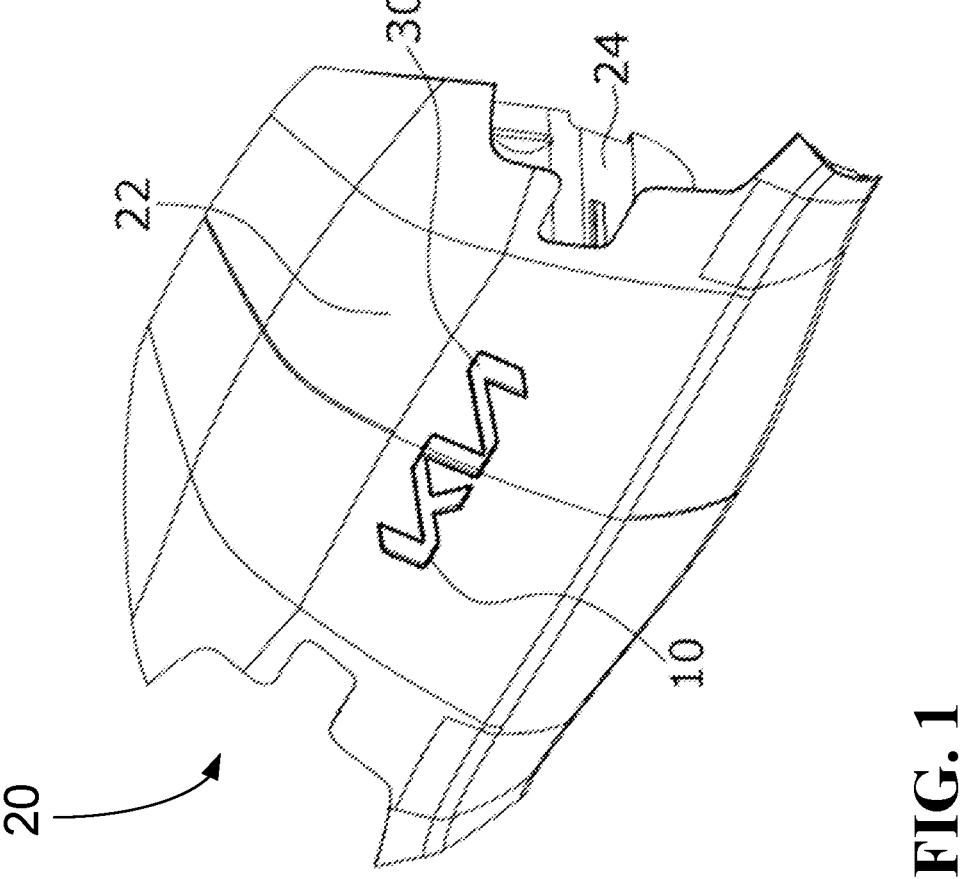
FIG. 1 is a view illustrating a shape in which a cover finish assembly is assembled according to one embodiment of the present invention.

Since the present invention allows for various changes and numerous embodiments, specific embodiments will be illustrated in the accompanying drawings and described in the detailed description. However, this is not intended to limit the present invention to the specific embodiments, and it is to be appreciated that all changes, equivalents, and substitutes falling within the spirit and technical scope of the present invention are encompassed in the present invention. In the description of the embodiments, certain detailed descriptions of the related art are omitted when it is deemed that they may unnecessarily obscure the gist of the inventive concept.

While terms such as "first" and "second" may be used to describe various components, such components are not limited by the above terms. The above terms are used only to distinguish one component from another.

The terminology used herein is for the purpose of describing particular embodiments only and is not intended to limit the present invention. The singular forms are intended to include the plural forms, unless the context clearly indicates otherwise. In the present specification, it should be understood that the terms "comprise," "comprising," "include," and/or "including," when used herein, specify the presence of stated features, numbers, steps, operations, elements, components, and/or combinations thereof but do not preclude the presence or addition of one or more other features, numbers, steps, operations, elements, components, and/or combinations thereof.

In addition, throughout the specification, when components are "connected," this may not only mean that two or more components are directly connected, but this may also mean that two or more components are indirectly connected through other components or are physically connected as well as electrically connected, or are one thing even referred to as different names according to positions or functions thereof.

In addition, when a first element is described as being formed or disposed "on" or "under" a second element, such a description includes both a case in which the two elements are formed or disposed in direct contact with each other and a case in which one or more other elements are interposed between the two elements. In addition, when a first element is described as being formed or disposed "on or under" a second element, such a description may include a case in which the first element is formed or disposed in an upward or downward direction with respect to the second element.

Hereinafter, embodiments of a cover finish assembly according to the present invention will be described in detail with reference to the accompanying drawings, and when the embodiments are described with reference to the accompanying drawings, components that are the same or correspond to each other will be denoted by the same reference numerals, and redundant description will be omitted.

FIG. 1 is a view illustrating a shape in which a cover finish assembly is assembled according to one embodiment of the present invention.

Referring to FIG. 1, a cover part 20 of a cover finish assembly according to one embodiment of the present invention is shown. The cover part 20 may be a horn cover for an airbag disposed on a vehicle steering wheel. In FIG. 1 illustrates an [and] example of the cover finish assembly disposed on the horn cover. An emblem may be formed on a front surface of an insertion part 30 that is inserted behind the cover part 20. A cap part 10 has the same emblem shape to mate with the emblem formed on the insertion part 30 through the cover part 20. In the present embodiment, the front surface of the insertion part 30 has a logo shape, and the cap part 10 has a shape which surrounds and covers the logo.

Figure 2:
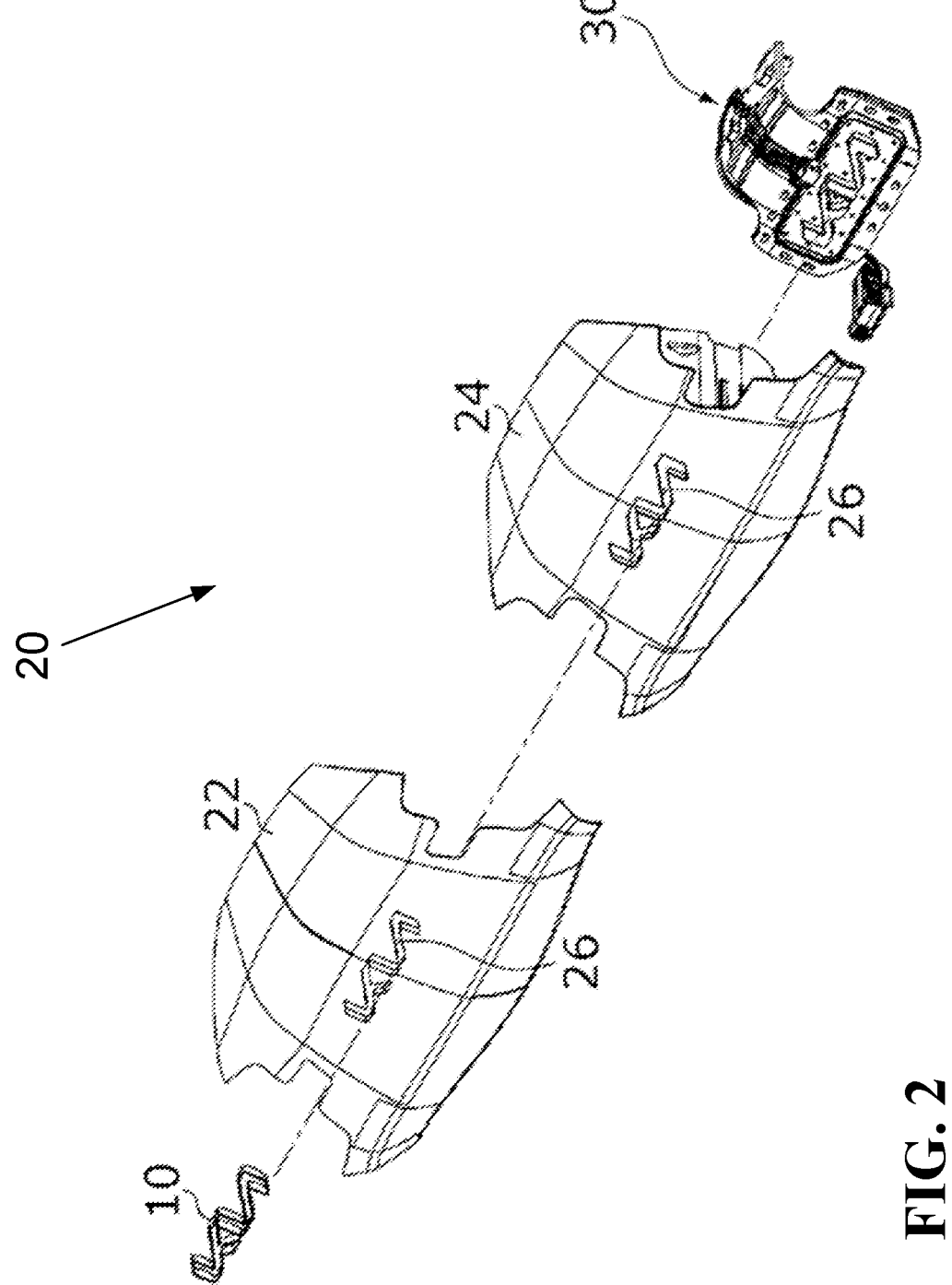
FIG. 2 is an exploded perspective view of the cover finish assembly according to one embodiment of the present invention.

FIG. 2 is an exploded perspective view of the cover finish assembly according to one embodiment of the present invention.

Referring to FIG. 2, the cover finish assembly according to one embodiment of the present invention may include the cover part 20 of which a front portion is covered with a leather cover 22 and in which an insertion hole 26 is formed, the cap part 10 which is inserted into the insertion hole 26 from a front surface of the cover part 20 and corresponds to an edge shape of the insertion hole 26. The insertion part 30 is inserted into the cap part 10 from a back surface of the cover part 20. Specifically, a front portion of the insertion part 30 matching the insertion hole 26 is exposed after the cap part 10 is inserted into the insertion hole 26 and is covered by the cover part 20.

As illustrated in FIG. 2, the cap part 10 may be disposed on a frontmost surface of the cover finish assembly and inserted into the insertion hole 26 of the cover part 20 disposed behind the cap part 10. The insertion part 30 may be disposed behind the cover part 20 and inserted into the insertion hole 26 from the back surface of the cover part 20.

In the present embodiment, the cover part 20 includes the leather cover 22 and an injection cover 24. The injection cover 24 is a cover formed of a hard material such as plastic, and the leather cover 22 is a cover which covers a front surface of the injection cover 24 for a design of the horn cover. The logo-shaped insertion hole 26 is formed in a center of the cover part 20. In this case, the leather cover 22 may not be completely attached to the injection cover 24 at an edge portion of the insertion hole 26. In addition, when the insertion part 30 is inserted from the back surface of the cover part 20, as the insertion part 30 is inserted while pushing a side surface and an edge of the insertion hole 26, a phenomenon in which the leather cover 22 is lifted may occur.

In the present embodiment, the insertion part 30 may be a lighting module. The lighting module includes a light-emitting element therein and emits light through a front surface. Since the lighting module is assembled with a circuit board, a control unit, and other components in addition to a portion (logo model) which emits light, the lighting module may not be assembled from the front surface of the cover part 20 and may be assembled forward from the back surface of the cover part 20. Accordingly, when the lighting module is inserted into the cover part 20 to which the leather cover 22 is applied, the above-described phenomenon in which the leather cover 22 is pushed and lifted occurs.

In the present embodiment, the cap part 10 which may cover an inner side surface of the insertion hole 26 formed in the cover part 20 is applied to prevent the phenomenon in which the leather cover 22 is lifted when the insertion part 30 is inserted into the insertion hole 26.

Figure 3:
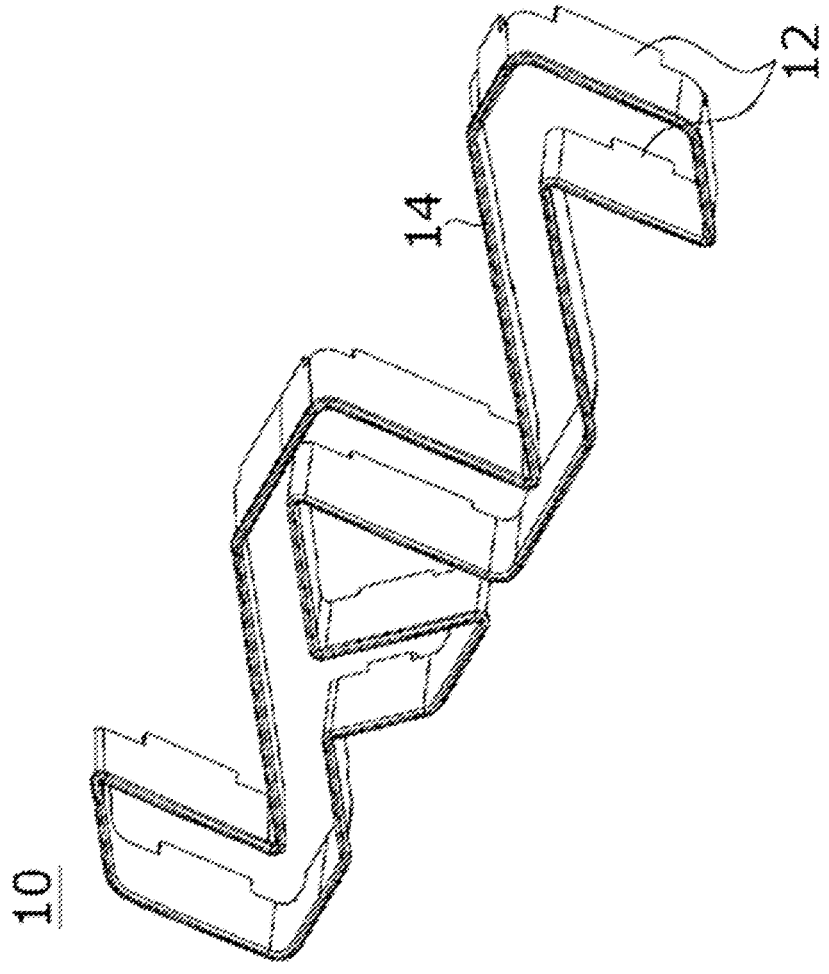
FIG. 3 is a view illustrating a cap part of the cover finish assembly according to one embodiment of the present invention.

FIG. 3 is a view illustrating the cap part of the cover finish assembly according to one embodiment of the present invention.

Referring to FIG. 3, the cap part 10 may correspond to the edge shape of the insertion hole 26. In the present embodiment, the cap part 10 is formed in a logo shape. In addition, since the cap part 10 may cover the side surface of the insertion hole 26 of the cover part 20, a height of the cap part 10 may correspond to a depth of the insertion hole 26 of the cover part 20.

A fixing pin 12 extending downward may be formed on a lower side of the cap part 10. The fixing pin 12 may be bent toward one side after the cap part 10 is inserted into the insertion hole 26 so that the cap part 10 may be fixedly hooked on the cover part 20. Accordingly, at least a part of the fixing pin 12 may pass through the insertion hole 26, and a direction in which the fixing pin 12 is bent may be opposite to a direction in which the insertion hole 26 is formed based on the fixing pin 12.

A shape of the fixing pin 12 may have a thickness equal to a thickness of the cap part 10 and extending downward. The thickness of the fixing pin 12 is not limited as long as it allows the cap part 10 to be fixedly hooked on the cover part 20.

An edge portion 14 may be formed on a front surface of the cap part 10. The edge portion 14 may be bent in front of the insertion hole 26 to cover the cover part 20 constituting the edge of the insertion hole 26. That is, the front surface of the cap part 10 may cover a portion around the insertion hole 26, finish the leather cover 22, and prevent the cap part 10 from being excessively inserted into the insertion hole 26.

After the cap part 10 is inserted into the insertion hole 26, two surfaces of the cap part 10 may be fixedly hooked on the cover part 20 by the edge portion 14 formed on a front surface and the fixing pin 12 formed on a lower side of the cap part 10 to prevent the cap part 10 from separating from the cover part 20.

Figure 4:
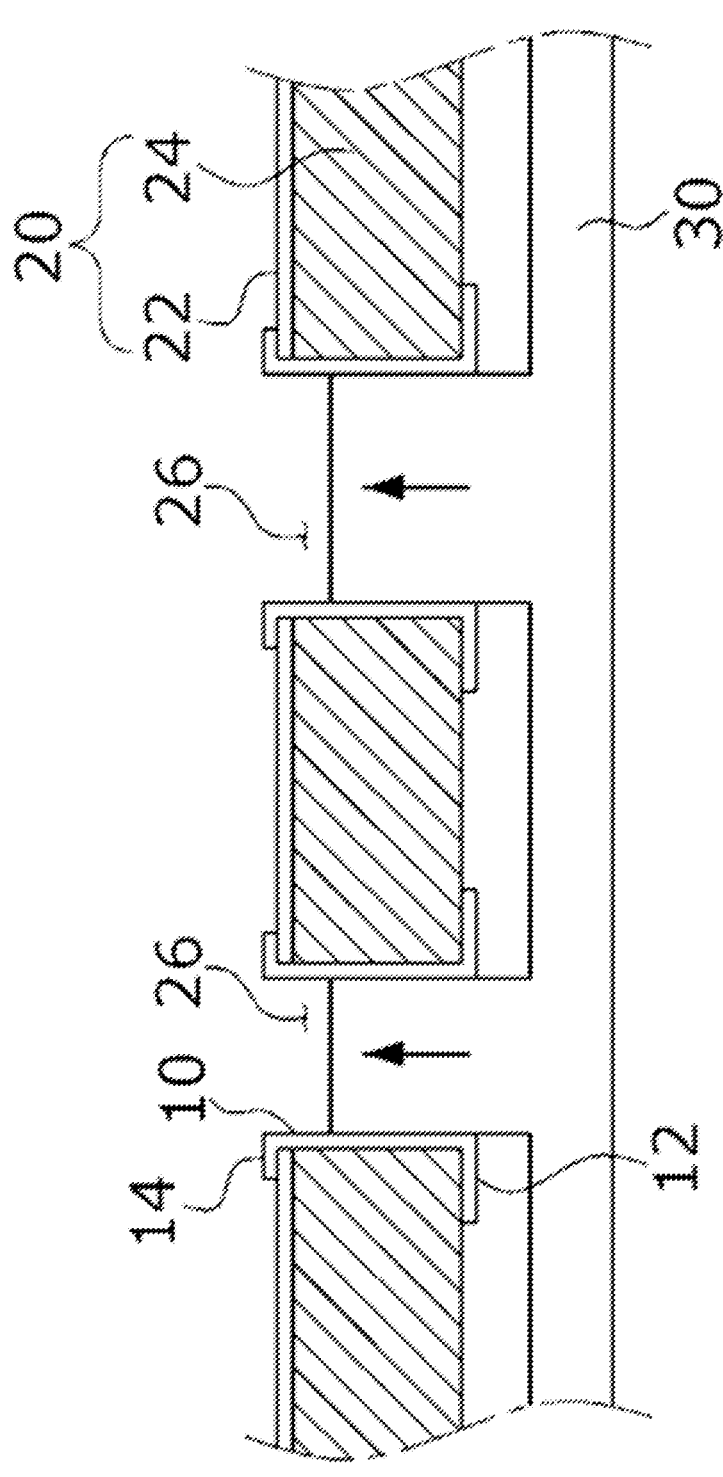
FIG. 4 is a cross-sectional view illustrating a shape in which the cover finish assembly is assembled according to one embodiment of the present invention.

FIG. 4 is a cross-sectional view illustrating a shape in which the cover finish assembly is assembled according to one embodiment of the present invention.

Referring to FIG. 4, the insertion part 30 may be inserted into the insertion hole 26 forward from the back surface of the cover part 20. Since the insertion from a back surface lifts the leather cover 22 and degrades the finish, the cap part 10 inserted from the front surface may be provided to prevent degradation of the finishing quality.

After the cap part 10 is inserted from the front surface and fixedly hooked on the cover part 20 by bending of the fixing pin 12, the insertion part 30 is inserted forward from the back surface of the cover part 20. Accordingly, the cap part 10 is disposed between the cover part 20 and the insertion part 30 inside the insertion hole 26. Since the insertion part 30 is inserted while coming into contact with the hard cap part 10 without coming into contact with the cover part 20, the superior finishing quality can be achieved.

A height of an inserted portion of the insertion part 30 may correspond to the depth of the insertion hole 26 and increase by as much as a thickness of the edge portion 14 and the thickness of the fixing pin 12 of the cap part 10. In addition, a cross-sectional area of a portion of the insertion part 30 exposed forward may correspond to a cross-sectional area of the insertion hole 26 and decrease by as much as the thickness of the cap part 10 disposed inside the insertion hole 26.

Figure 5:
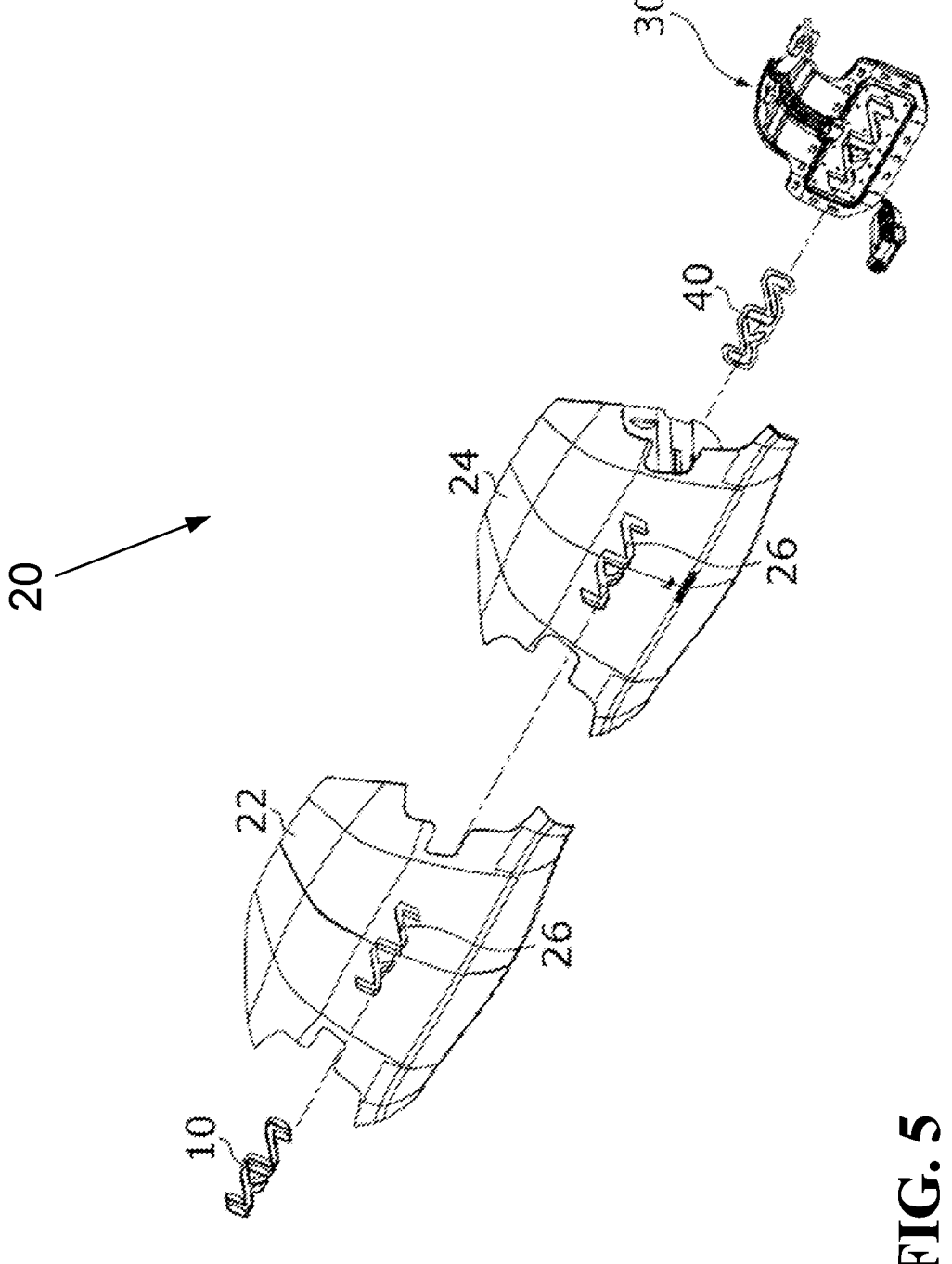
FIG. 5 is an exploded perspective view of a cover finish assembly according to another embodiment of the present invention.

FIG. 5 is an exploded perspective view of a cover finish assembly according to another embodiment of the present invention.

Referring to FIG. 5, the cover finish assembly according to another embodiment of the present invention may include a cover part 20 of which a front portion is covered with a leather cover 22 and in which an insertion hole 26 is formed, a cap part 10 which is inserted into the insertion hole 26 from a front surface of the cover part 20 and corresponds to an edge shape of the insertion hole 26, an insertion part 30 which is inserted into the cap part 10 from a back surface of the cover part 20 after the cap part 10 is inserted into the insertion hole 26 so that a front portion of the insertion part 30 is exposed, and a fixing plate 40 coupled to a lower side of the cap part 10.

Figure 6:
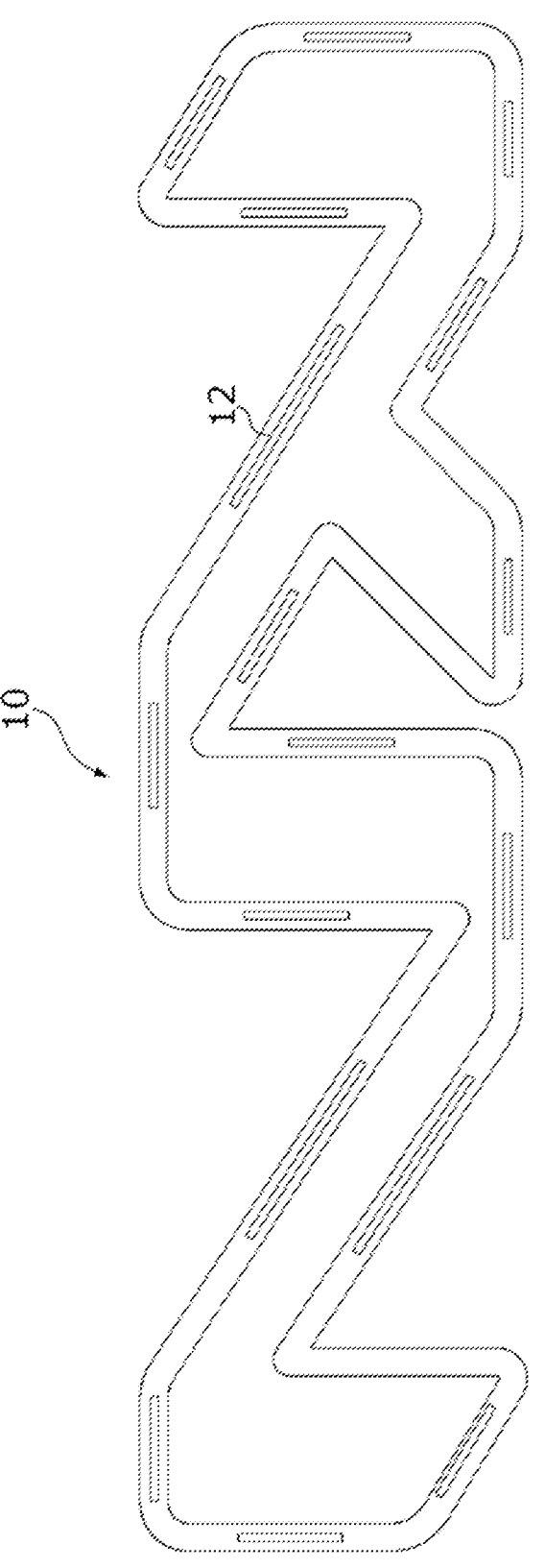
FIG. 6 is a view illustrating a cap part of the cover finish assembly according to another embodiment of the present invention.
Figure 7:
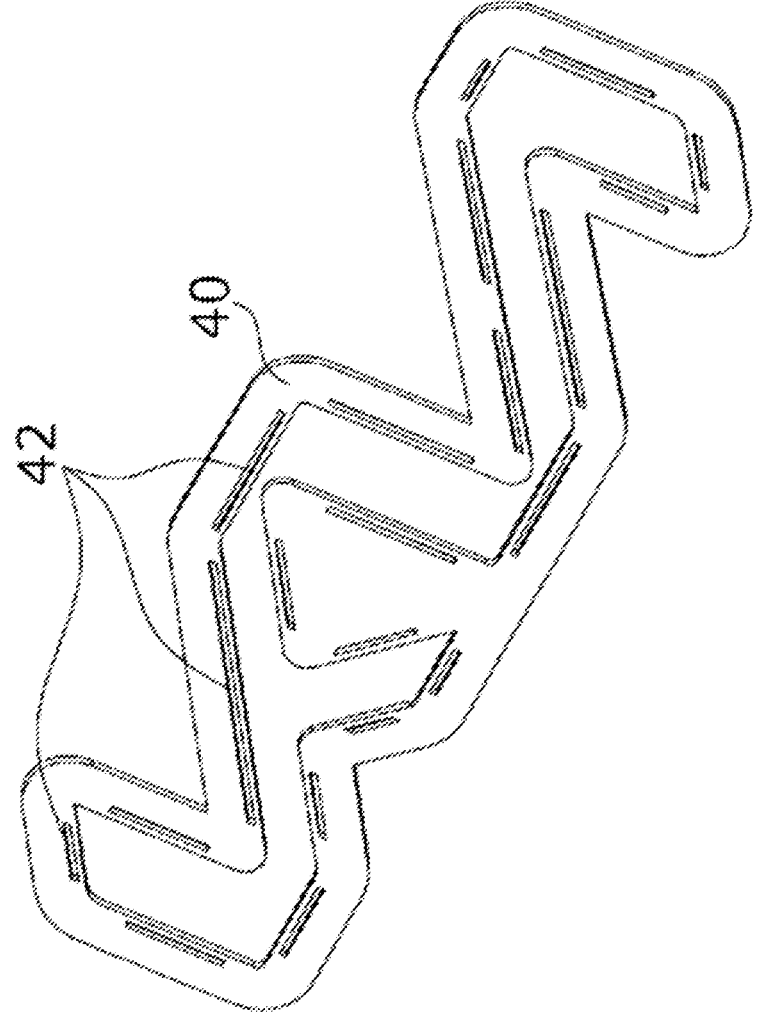
FIG. 7 is a view illustrating a fixing plate of the cover finish assembly according to another embodiment of the present invention.

FIG. 6 is a view illustrating the cap part of the cover finish assembly according to another embodiment of the present invention, and FIG. 7 is a view illustrating the fixing plate of the cover finish assembly according to another embodiment of the present invention.

An edge portion 14 may be formed on a front surface of the cap part 10 like the previous embodiment. The edge portion 14 may be bent in front of the insertion hole 26 to cover the cover part 20 constituting an edge of the insertion hole 26, and the front surface of the cap part 10 may cover a portion around insertion hole 26, finish the leather cover 22, and prevent the cap part 10 from being excessively inserted into the insertion hole 26.

The fixing plate 40 may be disposed on the back surface of the cover part 20 and coupled to the cap part 10. The cap part 10 may be firmly fixed to an inside of the insertion hole 26 of the cover part 20 using the fixing plate 40 and may finish a boundary of the cover part 20.

The fixing plate 40 may have a shape corresponding to the edge shape of the insertion hole 26, and, in the present embodiment, the fixing plate 40 has the shape which includes a portion around a logo model. In the case of the fixing plate 40, since the fixing plate 40 is disposed on the back surface of the cover part 20 and is not exposed to a user's sight, the fixing plate 40 does not need to correspond to the edge shape of the insertion hole 26. Accordingly, the shape has no limitation as long as a hole corresponding to a shape of the insertion hole 26 is formed so that the insertion part 30 may be inserted into the insertion hole 26.

A fixing hole 42 may be formed in the fixing plate 40 so that a fixing pin 12 formed on a lower side of the cap part 10 is inserted into the fixing hole 42. The fixing pin 12 may be bent toward one side after being inserted into the fixing hole 42 to allow the cap part 10 to be hooked on the fixing plate 40 and the cover part 20.

The fixing hole 42 formed in the fixing plate 40 may correspond to a position of the fixing pin 12 of the cap part 10, and a width of a portion of the fixing hole 42 formed in a surface in which the insertion hole 26 is disposed may be relatively smaller than that of a portion formed on an opposite surface. This is to prevent a cross-sectional area of the insertion hole 26 from being excessively reduced by the fixing plate 40 when the cap part 10 is inserted into the fixing hole 42 and reduce a difference in thickness of the cap part 10 between a portion in which the fixing plate 40 is disposed and a portion in which the fixing plate 40 is not disposed.

When an area of a portion of the fixing plate 40 protruding toward the insertion hole 26 increases, when the insertion part 30 is inserted, a gap between the insertion part 30 and the cap part 10 also increases. Consequently, the coupling of the cover finish assembly is less stable. As a result, there is a concern that foreign substances such as dust may penetrate through the gap between the cap part 10 and the insertion part 30.

As illustrated in FIG. 6, an inner side surface of the cap part 10 may protrude further inward in the insertion hole 26 than a portion on which the fixing pin 12 is formed and may be thicker than the portion. This is to firmly couple the cover finish assembly while reducing the above-described gap which may be generated between the insertion part 30 and the cap part 10.

A thickness of the inner side surface of the cap part 10 may be determined so that an inner surface of the fixing plate 40 and the inner side surface of the cap part 10 are formed to extend to be coplanar with each other when the fixing pin 12 of the cap part 10 is inserted into the fixing hole 42 of the fixing plate 40. Alternatively, the inner side surface of the cap part 10 may be formed to be disposed further inward in the insertion hole 26 than the inner surface of the fixing plate 40. In both the two cases, a cross-sectional area of the insertion part 30 may be formed as a portion obtained by subtracting a side surface of the cap part 10 from a cross-section of the insertion hole 26 to correspond to a thickness of the cap part 10 so as to minimize the gap between the cap part 10 and the insertion part 30.

Figure 8:
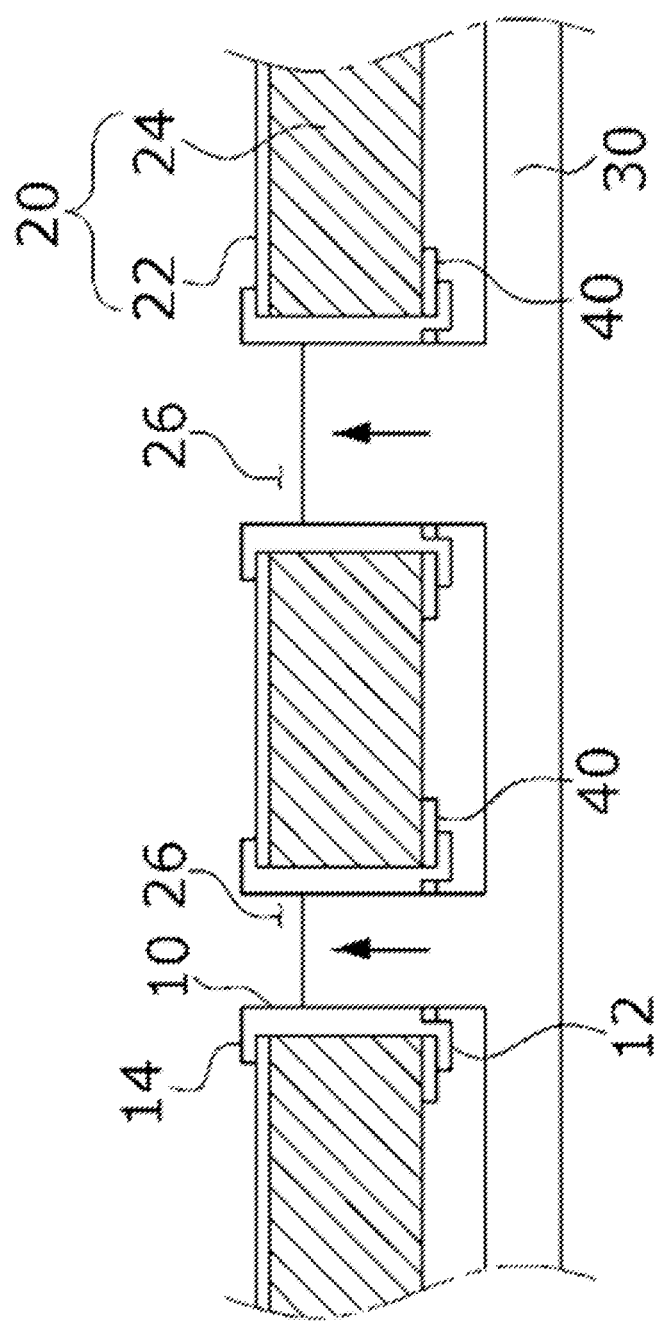
FIG. 8 is a cross-sectional view illustrating a shape in which the cover finish assembly is assembled according to another embodiment of the present invention.

FIG. 8 is a cross-sectional view illustrating a shape in which the cover finish assembly is assembled according to another embodiment of the present invention.

Referring to FIG. 8, the cap part 10 is inserted into the insertion hole 26 from the front surface toward the back surface of the cover part 20. The fixing plate 40 is disposed on the back surface of the cover part 20 such that the fixing pin 12 formed on the cap part 10 is inserted into the fixing hole 42 formed in the fixing plate 40. The fixing pin 12 is bent toward one side. Consequently, the cap part 10 is fixedly hooked on the fixing plate 40 and the cover part 20, the edge portion 14 is disposed on the front surface of the cap part 10, and thus two surfaces of the cap part 10 are fixedly hooked on the cover part 20.

After the cap part 10 and the fixing plate 40 are coupled, the insertion part 30 is inserted from the back surface of the cover part 20. In this case, since the insertion part 30 is inserted while coming into contact with the inner side surface of the cap part 10, the leather cover 22 of the cover part 20 may not be pushed, and the insertion part 30 can be inserted while maintaining superior finishing quality.

According to embodiments of the present invention, when a specific object constituting an emblem such as a lighting unit is inserted into a cover, with which leather is covered, from a back surface of a surface with which the leather is covered, a boundary surface of the leather is covered with a cap part to prevent the leather from being pushed and lifted, and thus superior finishing quality can be secured.

Useful advantages and effects of the present invention are not limited to the above-described contents and may be more easily understood while specific embodiments of the present invention have been described.

While the present invention has been described above with reference to exemplary embodiments, it may be understood by those skilled in the art that various modifications and changes of the present invention may be made within a range not departing from the spirit and scope of the present invention defined by the appended claims.

What is claimed is:

1. A cover finish assembly comprising:
   a cover part having a front portion covered with a leather cover and having an insertion hole formed therein;
   a cap part which is inserted into the insertion hole from a front surface of the cover part, the cap part corresponding in shape to a shape of the insertion hole; and an insertion part inserted into the cap part from a back surface of the cover part after the cap part is inserted into the insertion hole so that a front portion of the insertion part is received in the cap part,
wherein a portion of the cap part is disposed between the cover part and the insertion part.

2. The cover finish assembly of claim 1, wherein:
a fixing pin extends from a lower side of the cap part; and
the fixing pin passes through the insertion hole and is bent toward one side and hooked on the cover part.

3. The cover finish assembly of claim 2,
wherein the cover part constitutes at least a portion of an edge of the insertion hole, and
the cap part includes an edge portion which is arranged in front of the insertion hole and covers the cover part.

4. The cover finish assembly of claim 1, further comprising a fixing plate coupled to a lower side of the cap part,
wherein an opening in the fixing plate corresponds in shape to a shape of the insertion hole so that the insertion part passes through the fixing plate and the insertion hole.

5. The cover finish assembly of claim 4, wherein:
a fixing pin extends from a lower side of the cap part;
a fixing hole is formed in the fixing plate; and
the fixing pin is inserted into the fixing hole.

6. The cover finish assembly of claim 5, wherein, with the fixing pin inserted into the fixing hole, a portion of the fixing pin which passes through the fixing hole is bent toward one side and hooked on the cover part.

7. The cover finish assembly of claim 6, wherein a thickness of a portion of the cap part disposed inside the insertion hole is greater than a thickness of the fixing pin so that an inner side surface of the cap part is disposed to be coplanar with an inner boundary of the fixing plate.

8. The cover finish assembly of claim 7,
wherein the cover part constitutes at least a portion of an edge of the insertion hole,
and the cap part includes an edge portion that is bent in front of the insertion hole and covers the cover part.

9. The cover finish assembly of claim 8, wherein:
the insertion part includes a lighting unit to emit light forward; and
the cap part and the insertion part constitute an emblem of a vehicle.

10. The cover finish assembly of claim 9, wherein the cap part is formed of aluminum.

* * * * *